C. B. SCHOENMEHL.
PRIMARY BATTERY.
APPLICATION FILED MAY 3, 1912.
1,055,563.
Patented Mar. 11, 1913.
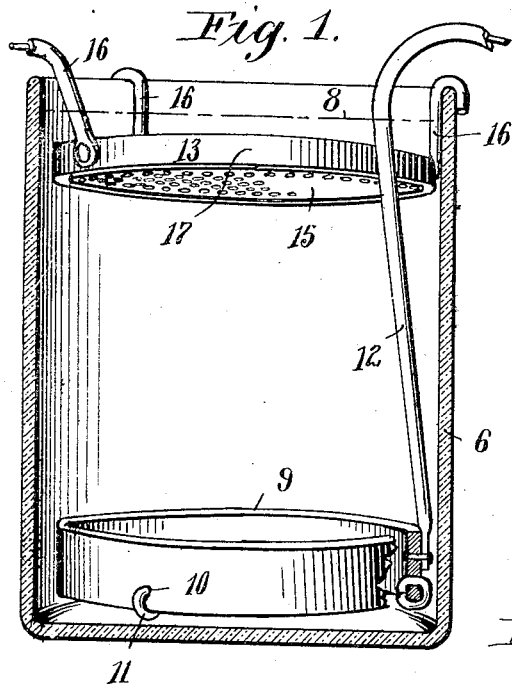
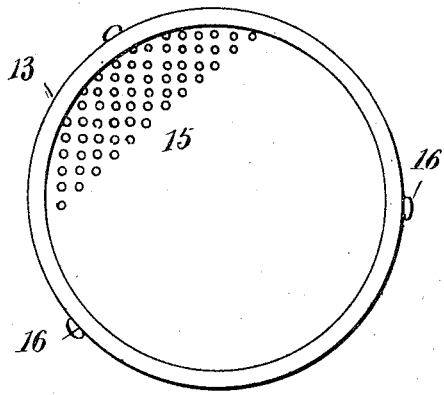
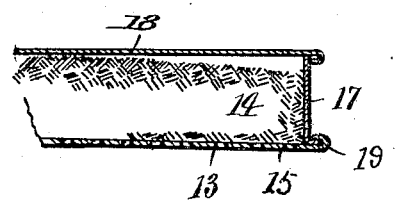
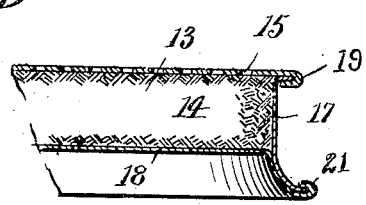
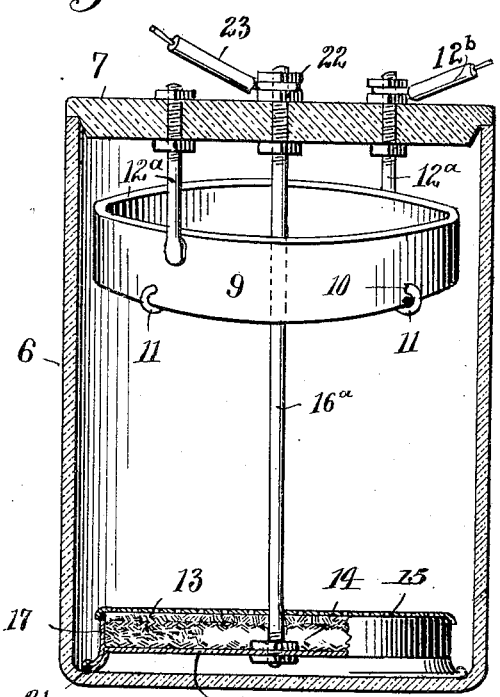
Witnesses
Ivan L. Morehouse
E. Earle Garlick
Inventor
Charles B. Schoenmehl
By Chamberlain & Newman
Attorneys

UNITED STATES PATENT OFFICE.

CHARLES B. SCHOENMEHL, OF WATERBURY, CONNECTICUT.

PRIMARY BATTERY.

1,055,563.   Specification of Letters Patent.   Patented Mar. 11, 1913.

Application filed May 3, 1912. Serial No. 694,885.

*To all whom it may concern:*

Be it known that I, CHARLES B. SCHOENMEHL, citizen of the United States, and resident of Waterbury, in the county of New Haven and State of Connecticut, have invented certain new and useful Improvements in Primary Batteries, of which the following is a specification.

This invention relates to a new form of high resistance or track circuit battery, such as are commonly used in connection with automatic block signals, and the like.

The object of the invention is to improve upon batteries of the above class by providing an improved and simplified form of cell, having a high internal resistance and whose electrodes are separate and distinct and can be readily replaced or renewed with little or no trouble.

Among the novel features of my improved cell is the construction and arrangement of the several parts, and whereby the electrodes are arranged one above the other; to so construct and arrange the parts that they may be renewed without directly handling any portion of the cell which has been in the solution.

The form of the elements, their position in the cell and the means of retaining them in such positions, are also features which go to make up the complete novel structure.

Upon the accompanying drawings forming a part of this specification, similar characters of reference will be found to designate like or corresponding parts throughout the several figures, and of which, Figure 1, shows a sectional perspective view of my improved form of battery complete. Fig. 2, is an inverted plan view of the negative electrode detached. Fig. 3, is an enlarged detail cross sectional view of the negative electrode container shown in Figs. 1 and 2. Fig. 4, is an enlarged cross sectional view of the negative electrode shown in Fig. 5, and Fig. 5, is a further sectional perspective view of a battery wherein the relative positions of the electrodes are reversed from that shown in Fig. 1, and are also shown suspended from a battery jar cover.

Upon the accompanying drawings 6 represents a battery jar and 7 a cover, as shown in Fig. 5, the same being necessary only when it is desired to insulatively connect the two electrodes and suspend the same from a single bridge. The electrodes are both designed to be submerged in a caustic soda solution the top line of which is shown at 8 in Fig. 1.

The positive electrode is produced in the form of a circular or annular zinc 9 that may be made of either cast or sheet zinc as preferred. A series of holes 40 are formed in the lower edge portion of this zinc for the attachment of rubber covered rings 11 that form insulating supports to hold the electrode off from the walls of the battery jar and likewise to support it from and above the bottom if desired, as shown in Fig. 1.

12 represents a rubber covered field wire that is shown connected to the said positive electrode in Fig. 1.

In Fig. 1, the negative electrode 13 is supported above the positive electrode and independently therefrom. It is formed of sheet metal and comprises a round flat receptacle including upwardly disposed sides, and is filled with copper oxid 14. The horizontal wall 15 adjacent to the zinc electrode is perforated to permit the solution to penetrate the mass of oxid and allow it to coact upon the zinc and effect the operation. The top of this container may be entirely open as shown in Fig. 3, if desired to better permit the solution to attack the oxid. This container 13 as shown in Figs. 1 and 2 is provided with three supports 16 that are in the form of rubber covered rods, one end of which is attached to the container and the other end bent over and down to engage the top edge of the battery jar and be suspended therefrom. The negative electrode container 13 as shown, is formed of two, or three pieces of sheet metal as preferred, viz: a flat horizonal bottom side 18 having an upwardly disposed annular band 17 and a perforated cover 15. The edge portion of the perforated side 15 and the band 17 may be lapped and seamed together as shown at 19 in Figs. 3 and 4, while the other edge of the band and the bottom side 18 may be larger and extended as shown at 21, Figs. 4 and 5 to form a footing or support for the electrode when the same is supported from the bottom of the jar as shown in Fig. 5.

In Fig. 5, I have shown the relative positions of the two opposed electrodes reversed and both connected to and supported from the cover of the battery jar. In this instance the hanger rods 12ᵃ are secured to the sides of the zinc and attached to the insulating cover 7. Nuts are employed for the attachment of these rods to the cover and one of the rods may form a conductor to which the field wire 12$^b$ is attached. The negative element shown in this figure is like the element shown in Fig. 4, in that it is provided with a perforated top side and is provided with the extended flange 21 to form a footing.

One end of the central suspension rod 16$^a$ is secured to the middle portion of the container 13 and the other end is attached to the cover, 7, by means of nuts 22 as shown and to which a field wire 23 may be connected. This arrangement obviously permits the electrode to be lifted out of the solution with the removal of the cover as will be apparent.

Having thus described my invention what I claim and desire to secure by Letters Patent is:

1. In a track circuit battery, the combination of a battery jar, a horizontally disposed zinc electrode arranged in one end thereof, a negative electrode comprising an inclosed round flat container also horizontally arranged within said jar and having its side adjacent to the zinc perforated, a filling of oxid of copper within said container, one of said electrodes being arranged above the other, and a supporting rod connected to the negative electrode and supported from the top of the battery jar.

2. In a track circuit battery, the combination of a battery jar, a horizontally disposed circular zinc electrode arranged in one end thereof, a negative electrode comprising a round flat perforated container also horizontally arranged within said jar and having an annular extended supporting flange upon one edge, a filling of oxid of copper within said container, one of said electrodes being arranged above the other, and a supporting rod connected to the negative electrode and supported from the top of the battery jar.

3. In a track circuit battery of the class described, the combination with an oxid of copper negative electrode arranged in a battery jar, a circular zinc electrode arranged opposite the negative electrode, and a series of rubber covered wire rings secured to the edge of the zinc electrode to position it from the jar.

Signed at Bridgeport in the county of Fairfield and State of Connecticut this 24 day of April A. D., 1912.

CHARLES B. SCHOENMEHL.

Witnesses:
MARTIN L. MARTUS,
ARTHUR A. PAGE.

---

Copies of this patent may be obtained for five cents each, by addressing the "Commissioner of Patents, Washington, D. C."